United States Patent [19]
Keith et al.

[11] Patent Number: 5,187,793
[45] Date of Patent: Feb. 16, 1993

[54] PROCESSOR WITH HIERARCHAL MEMORY AND USING META-INSTRUCTIONS FOR SOFTWARE CONTROL OF LOADING, UNLOADING AND EXECUTION OF MACHINE INSTRUCTIONS STORED IN THE CACHE

[75] Inventors: John M. Keith, Washington Crossing, Pa.; Allen H. Simon, Belle Mead, N.J.; David L. Sprague; Douglas F. Dixon, both of Hopewell, N.J.; Judith A. Goldstein, Cranberry, N.J.

[73] Assignee: Intel Corporation, Santa Clara, Calif.

[21] Appl. No.: 294,888

[22] Filed: Jan. 9, 1989

[51] Int. Cl.⁵ .............................................. G06F 9/00
[52] U.S. Cl. ...................... 395/775; 364/243.4; 364/243.42; 364/260.2; 364/262.9; 364/DIG. 1; 395/375; 395/425
[58] Field of Search ... 364/200 MS File, 900 MS File; 395/375, 425, 775

[56] References Cited
U.S. PATENT DOCUMENTS

| | | | |
|---|---|---|---|
| 3,771,137 | 11/1973 | Barner | 364/200 |
| 3,845,474 | 10/1974 | Lange | 364/200 |
| 4,156,906 | 5/1979 | Ryan | 364/200 |
| 4,346,436 | 8/1982 | Wise | 364/200 |
| 4,447,879 | 5/1984 | Fong | 364/200 |
| 4,450,523 | 5/1984 | Pilat | 364/200 |
| 4,466,057 | 8/1984 | Housemann | 364/200 |
| 4,516,203 | 5/1985 | Farber | 364/200 |
| 4,713,755 | 12/1987 | Worley | 364/200 |
| 4,719,568 | 1/1988 | Carrubba | 364/200 |
| 4,720,779 | 1/1988 | Reynard | 364/200 |
| 4,782,461 | 11/1988 | Mick | 364/900 |
| 4,785,392 | 11/1988 | Maier | 364/200 |
| 4,787,035 | 11/1988 | Bourne | 364/300 |
| 4,905,138 | 2/1990 | Bourne | 364/200 |
| 5,093,784 | 3/1992 | Hanatani | 395/775 |

*Primary Examiner*—Lawrence E. Anderson
*Assistant Examiner*—Eric Coleman
*Attorney, Agent, or Firm*—Carl L. Silverman; James E. Jacobson, Jr.; William H. Murray

[57] ABSTRACT

An instruction caching system comprises meta-instructions which are contained within the program being executed. A meta-machine, which is a small segment of software, executes the meta-instructions and passes control to the processor itself at appropriate times to execute blocks of instructions from the instruction cache.

11 Claims, 2 Drawing Sheets

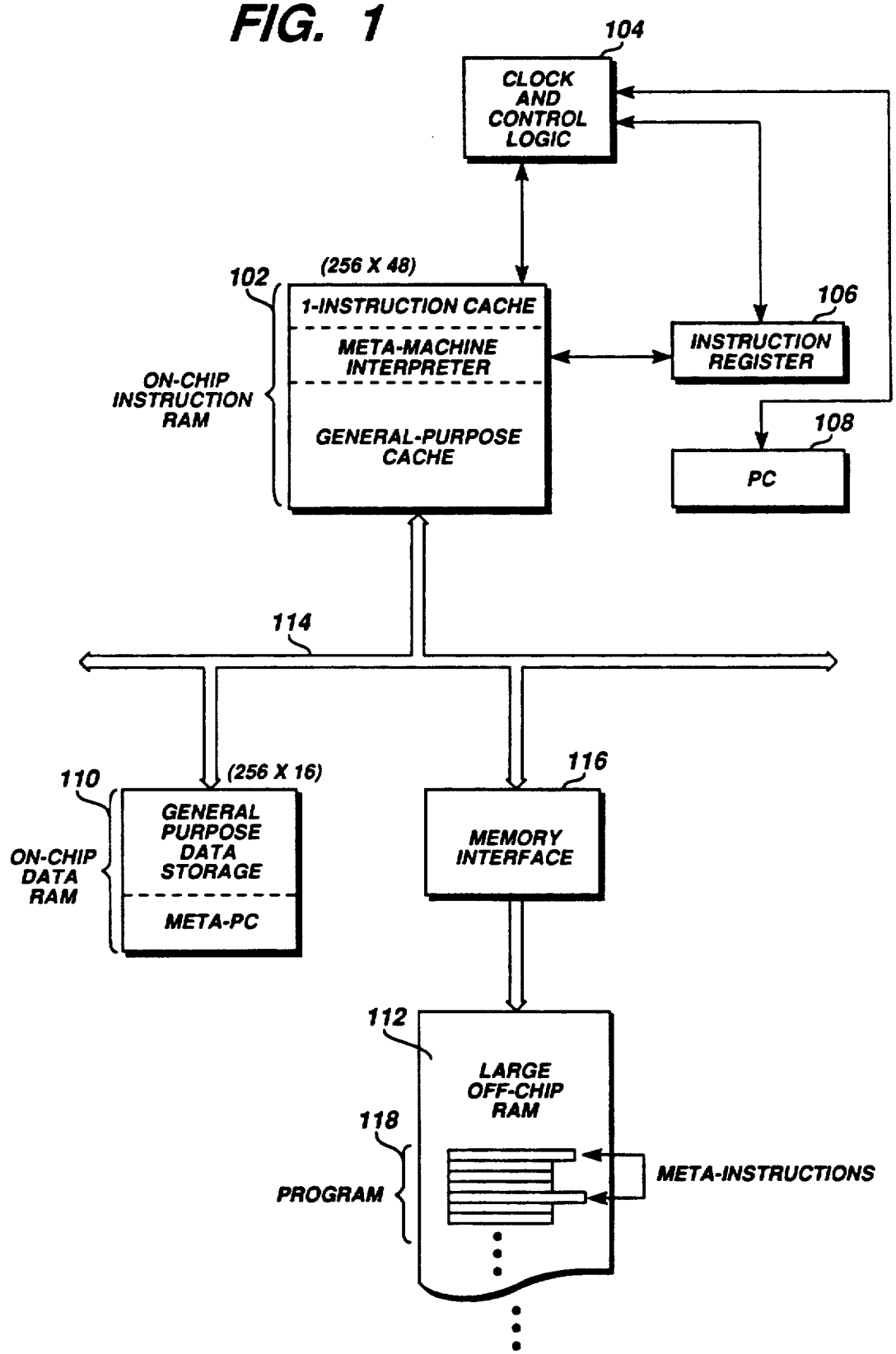

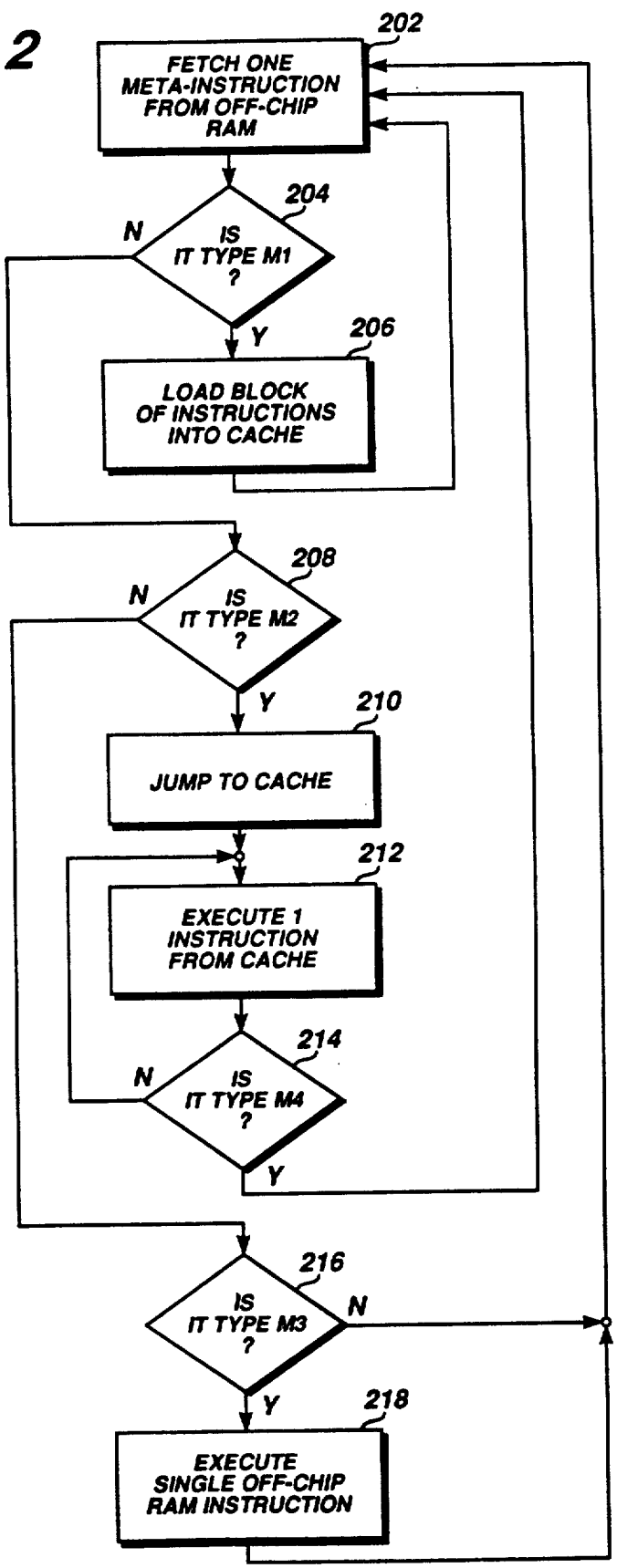

PROCESSOR WITH HIERARCHAL MEMORY AND USING META-INSTRUCTIONS FOR SOFTWARE CONTROL OF LOADING, UNLOADING AND EXECUTION OF MACHINE INSTRUCTIONS STORED IN THE CACHE

FIELD OF THE INVENTION

This invention relates to computers and more particularly to microprocessors or similar programmable processing chips containing an on-chip instruction cache.

BACKGROUND OF THE INVENTION

Microprocessors are typically connected to an external memory (RAM) by means of a read-write channel. Typically, the read-write channel has a relatively narrow bandwidth. The program to be executed by the microprocessor is typically stored in the external RAM. Because the microprocessor continually accesses all of its instructions from the RAM, the speed of system operation is limited by the relatively narrow bandwidth of the read-write channel, regardless of the speed of operation of the microprocessor itself. Accordingly, the read-write channel is a major factor which limits the power of the microprocessor.

To overcome this limitation, instruction caches are used to increase the execution efficiency of the processor by storing frequently-used instructions in a relatively small on-chip RAM, known as an "instruction cache", when executing programs from the relatively large off-chip system RAM. The typical implementation of an instruction cache involves a special-purpose block of logic on the processor that controls the caching of instructions. This logic is responsible for determining whether the next instruction that needs to be executed is already in the cache.

If the instruction is already in the cache, it is executed relatively quickly from the cache; otherwise, it is read relatively slowly from the off-chip RAM into the cache, and is then executed. In the latter case, some specific algorithm must be used to determine which instruction in the cache, which may already be full, should be removed to make room for the new instruction read from the off-chip RAM.

Although this approach, hereinafter referred to as a "hardware cache", leads to an increase in performance as compared to a processor without a cache, a problem still remains. This problem is that the caching algorithm is fixed in hardware. In addition, due to chip complexity constraints, the hardware fixed algorithm is usually rather simple. No matter what the algorithm is, it is always possible to find programs, especially large programs, for which the algorithm does not perform very well. This is due to the fact that such algorithms are usually very "local" in nature and therefore do not take into account the global structure of a program or are simply not well matched to the execution profile of some programs.

In addition, a hardware cache requires a possibly significant amount of chip area for the caching logic circuitry, registers or RAM blocks etc. By way of example, one hardware caching scheme, known in the art as a two-way associative cache, requires a fairly large on-chip RAM, on the order of 500-1000 bytes, in addition to the no-chip instruction RAM, in order to implement the caching algorithm.

SUMMARY OF THE INVENTION

The present invention comprises an improvement on and an alternative to the hardware cache described previously. In the present invention, the caching operations are done entirely in software. That is, the program itself that is being executed contains instructions within it that control the caching of instructions. These "instructions about instructions" are referred to as "meta-instructions". The processor itself cannot execute these meta-instructions since they are not physical machine instructions; instead, a "meta-machine", which is actually a small piece of software, executes the meta-instructions and passes control to the "machine", that is the actual processor itself, at appropriate times to execute blocks of instructions from the cache.

In the preferred embodiment, the meta-machine is a machine-instruction program that resides at all times in the on-chip instruction RAM and interprets meta-machine instructions from off-chip RAM. A "program" in this environment resides in off-chip RAM, and is a mixture of instructions and meta-instructions.

In a preferred embodiment of this invention, there are three meta-instructions. A first meta-instruction, M1, loads a block of instructions from off-chip RAM to the on-chip cache. A second meta-instruction, M2, starts the machine executing at a specified location in the on-chip cache. A third meta-instruction, M3, executes a single machine instruction from off-chip RAM. There is also a special machine instruction, M4, which starts the meta-machine interpreter executing at a specified location in off-chip RAM.

In a preferred embodiment of the invention, a program is executed by loading a meta-machine program counter, which is separate from the machine program counter, with the starting address of the program in off-chip RAM, and starting the meta-machine running. If all of the meta-machine instructions are of type M3, the chip will merely emulate a processor that has no instruction cache. To use caching, an M1 instruction must be included in the program in order to load some portion of the program into the cache. This is followed, but not necessarily immediately, by an M2 instruction to execute the cached instructions. At the end of the cached section of code, an M4 instruction would be used to "return" to meta-machine mode, which could then execute some M3 instructions, load another block, etc. In this way, the caching of program instructions can be completely and deterministically controlled by the programmer, thus optimizing the run-time efficiency of the program.

BRIEF DESCRIPTION OF THE DRAWING

The foregoing and further features of the invention are shown on the accompanying drawing in which like elements are denoted by like reference designators and in which:

FIG. 1 is a block diagram of a preferred embodiment of a programmable instruction cache in accordance with the present invention.

FIG. 2 is a flow chart illustrating operation of the programmable instruction cache depicted in FIG. 1.

DETAILED DESCRIPTION

Referring now to FIG. 1, there is shown a block diagram of a preferred embodiment of the programmable instruction cache in accordance with the present invention. The cache is implemented on a processor chip which includes, in addition to other standard circuitry, an on-chip instruction random access memory (RAM) 102. The RAM 102 is preferably a 256 instruction ×48-bit RAM, since each machine instruction in the preferred embodiment is a 48-bit microcode instruction word. Although the RAM 102 is physically a single unit in the preferred embodiment, it is logically divided in three sections. A first, relatively small (approximately 30 instructions in the preferred embodiment) section contains a meta-machine interpreter, which will be described later on in this detailed description. A second section comprises a 1-instruction cache for temporary storage of an instruction when executing in 1-instruction-at-a-time mode. The remaining section, containing approximately 226 instructions in the preferred embodiment, is used as the instruction cache for the purpose of implementing the present invention.

This logical division of the RAM 102 is accomplished entirely with software and can be changed dynamically, if necessary. For example, suppose there is a program that would execute considerably more efficiently with a 250-instruction cache as opposed to a 226-instruction cache. Furthermore, suppose the entire program fits into these 250 instructions. Then, increased efficiency could be achieved by temporarily making the cache larger; for example, by overwriting the meta-machine interpreter. In this example, the meta-machine interpreter is not needed when executing the program since the program consists entirely of machine instructions with no intervening meta-instructions. After the program has been completed, the meta-machine interpreter can be re-loaded.

In other cases, it might be desirable to actually make the cache smaller and gain increased efficiency by having a more complex meta-machine interpreter. Although the preferred embodiment of this invention uses RAM for all three sections of the on-board instruction store, which allows for the flexibility discussed above, it is also possible to put the meta-machine interpreter in ROM, thus saving some chip area.

The instruction RAM 102 is controlled by a clock and control logic portion 104 which performs the usual functions of instruction sequencing. An instruction register 106 is used to hold the current instruction being executed; that is, the last instruction fetched from the RAM 102. A program counter (PC) 108, which is controlled by the clock and control logic portion 104, maintains the address, within the RAM 102, of the instruction being executed at any given time.

In addition to other standard processor features such as registers, condition codes, etc., instructions being executed also have access to an on-chip data RAM 110 and an off-chip system RAM 112. In the preferred embodiment, the on-chip data RAM 110 is a 256 word×16-bit RAM which is accessed by the instructions through bus 114. The off-chip system RAM 112 is accessed by the instructions through bus 114 and a memory interface portion 116. In the preferred embodiment, the RAM 112 is a relatively large off-chip system RAM which contains the actual program code to be executed by the processor.

As with the instruction RAM 102, the data RAM 110 is also partitioned into logical sections. These sections include a large general-purpose section for use by executing programs; and a small section reserved for use by the meta-machine interpreter. The meta-machine section contains the meta-program counter (meta-PC), which is analogous to the program counter (PC) 108 but differs in the following respects. First, the meta-PC is an address into the off-chip RAM 112 rather than an address into the on-chip RAM 102. Secondly, because the off-chip RAM 112 has a much larger address space than the on-chip RAM 102, the meta-PC is preferably 32 bits, as opposed to 8 bits for the preferred embodiment of the PC 108.

Lastly, the value of the meta-PC is maintained via software, namely the meta-machine interpreter as opposed to the "real" PC 108 whose value, which controls processor execution flow, is updated by the clock and control logic portion 104. For example, a meta-machine instruction does an unconditional meta-branch by executing a machine instruction to load a new value into the meta-PC. Instruction fetching in the meta-machine is also done in software rather than hardware; that is, the meta-machine interpreter looks at the meta-PC and then loads the meta-instruction from the off-chip RAM 112 from this address into the 1-instruction cache section of the on-chip RAM 102. This is different from the real machine instruction, in which instruction fetching from on-chip RAM is done automatically via hardware logic.

The program being executed, generally referred to as 118 in FIG. 1, is depicted schematically as a mixture of ordinary instructions, which are 48 bits each in the preferred embodiment; and meta-instructions, which are longer. Different types of meta-instructions may be different lengths, but all are typically more than 48 bits in the preferred embodiment, as they contain additional data fields not used by the ordinary instructions.

Referring now to FIG. 2, there is shown a diagram of the control flow of the meta-machine interpreter. The symbols M1, M2 and M3 refer to three types of meta-machine instructions; and M4 refers to a special type of machine instruction. In the preferred embodiment, these types of instructions are identified by special values in the jump-address field of the instruction. Alternatively, they could be described with two dedicated bits of the instruction word.

The main operation of the interpreter is represented by step 202, which reads one meta-instuction from the off-chip RAM 112, from the location pointed to by the meta-PC section of the on-chip data RAM 110, into the 1-instruction cache in the on-chip instruction RAM 102. If the instruction is of type M1, as determined by the test in step 204, the interpreter loads a block of instructions from off-chip RAM 112 into the on-chip cache section of the on-chip instruction RAM 102 in accordance with step 206. The location of these instructions in the off-chip RAM 112, the number of instructions to load, and the location in the cache section of the on-chip instruction RAM 102 into which they are to be loaded, are all data fields of the meta-instruction. After performing step 206, control is returned to the interpreter main loop represented by step 202.

If the meta-instruction is not type M1, it is tested in step 208 for type M2. If it is of type M2, a branch into the cache section of the on-chip instruction RAM 102 is performed in accordance with step 210; thus beginning execution of a section of machine instructions in accordance with step 212. Machine execution continues until an instruction of type M4 is encountered as determined by the test of step 214. In such case, control returns to the interpreter main loop step 202.

Finally, if the meta-instruction is type M3, as determined by the test of step 216, then it is simply executed as a normal machine instruction, and control returns to the interpreter main loop step 202. It should be noted that it is not necessary to fetch a machine instruction after encountering a meta-instruction of type M3. This is because every meta-instruction contains a machine instruction as a subset. Therefore, if a meta-instruction is of type M3, the machine instruction to be executed has already been loaded into the 1-instruction cache section of the on-chip instruction RAM 102, and can simply be executed. This provides a relatively efficient single-instruction-at-a-time execution.

As described above, a meta-instruction can perform an unconditional meta-branch by simply loading a value into the meta-PC section of the on-chip data RAM 110. Meta-instructions can also perform conditional-branches utilizing the following method. Such an instruction, of type M3, has coded within its machine-instruction subset a conditional branch which branches to one of two different instructions in the meta-machine interpreter based on the current condition flags. One of these instructions is simply a branch to step 202; that is, essentially a NOP, which cases the meta-machine interpreter to fetch the next sequential machine-instruction. In such case, no meta-branch occurs. The other instruction, which gets branched to if the condition on the conditional branch is satisfied, loads the meta-PC section of the on-chip data RAM 110 with a new value obtained from one of the fields in the meta-instruction, followed by a branch to step 202, thus causing the meta-branch to occur.

By way of comparison of the present invention with the prior art, namely a hardware cache, consider the case of a program that simply consists of a long string of "straight-line" code; that is, a set of instructions with no branches that are executed in sequential order. In the case of hardware cache, since no instructions are executed more than once, every instruction would have to be fetched from off-chip RAM, and no efficiency would be gained from the cache. Similarly, in the present invention, all instructions would be coded as type M3 and simply executed from off-chip RAM.

Another possibility is the case where the program does contain branches and loops but in which the entire program fits in the on-chip instruction cache. In the case of a hardware cache, the program would eventually, after each instruction is executed once, reside entirely in the on-chip cache, and would be executed quite efficiently. Similarly, in the present invention, this case would be handled by encoding a meta-instruction at the beginning of the program to load the entire block of actual program instructions into the cache, from which they would then be executed efficiently.

In both of these cases, the programmable software cache attains equivalent performance to the hardware cache, but with the advantage that the programmable cache of the present invention is less expensive in chip area. In some cases, it is possible for the software cache to actually attain higher performance than a hardware cache. This can happen if the "inner loop", that is the section of a program containing the instructions that are executed most frequently, is either very large or is distributed in a non-sequential way throughout memory. For example, an inner loop that calls a number of subroutines located at distant addresses in the program. A hardware cache, which typically caches instructions based on their addresses, would not cache the entire inner loop, even if it all fit in the on-chip cache, but would continually fetch some subset of the inner loop from off-chip RAM. By contrast, in the present invention, the programmer could detect this situation and include the proper meta-instruction in the program to cause the entire inner loop, including all the sub-routines, to be cached, thus increasing the efficiency of execution of the program.

We claim:

1. A hierarchical memory system for a digital data processor comprising:
    (a) a relatively large, slow main memory;
    (b) a relatively small, high speed cache memory;
    (c) a plurality of meta-instructions, stored in said main memory, for controlling the loading and unloading of information in the cache memory, said plurality of meta-instructions comprising:
        (i) a first meta-instruction for loading a block of machine instructions from said main memory into an instruction portion of said cache memory;
        (ii) a second meta-instruction for causing the processor to execute a machine instruction at a specified location in the instruction portion of said cache memory; and
        (iii) a third meta-instruction for executing a single machine instruction from said main memory;
    (d) a meta-machine interpreter, comprising a machine instruction program stored in said cache memory, for executing said meta-instructions; and
    (e) a special machine instruction for causing said meta-machine interpreter to execute a meta-machine at a specified location in said main memory.

2. A hierarchical memory system in accordance with claim 1 wherein said instruction portion of said cache memory includes a section for temporary storage of a meta-instruction when executed in a one-instruction-at-a-time mode.

3. A hierarchical memory system in accordance with claim 2 wherein said cache memory additionally comprises a data portion.

4. A hierarchical memory system in accordance with claim 3 wherein said data portion of said cache memory includes a meta-program counter section for storing a meta-program counter having a value which provides an address into said off-chip RAM.

5. A hierarchical memory system in accordance with claim 4 wherein the value of the meta-program counter is maintained by said meta-machine interpreter.

6. A hierarchical memory system in accordance with claim 5 wherein said cache memory includes a general-purpose section for use by executing programs.

7. A hierarchical memory system in accordance with claim 6 wherein said machine instruction comprises 48 bits.

8. A hierarchical memory system in accordance with claim 6 wherein said meta-instructions are each greater than 48 bits in length.

9. A hierarchical memory system in accordance with claim 6 wherein said instruction portion of said cache memory has a capacity of 256 instructions × 48-bits.

10. A hierarchical memory system in accordance with claim 6 wherein said data portion of said cache memory has a capacity of 256 words × 16 bits.

11. A hierarchical memory system for use in a digital data processor including a microprocessor formed on a semiconductor chip, said hierarchical memory system comprising:
    (a) a relatively large, slow off-chip random access memory (RAM);

(b) a relatively small, high speed on-chip random access memory (RAM);

(c) a plurality of meta-instructions, stored in said main memory, for controlling the loading and unloading of information in the cache memory, said plurality of meta-instructions including:

(i) a first meta-instruction for loading a block of machine instructions from said off-chip RAM into an instruction portion of said on-chip RAM;

(ii) a second meta-instruction for causing the processor to execute a machine instruction at a specified location in the instruction portion of said on-chip RAM;

(iii) a third meta-machine instruction for executing a single machine instruction from said off-chip RAM;

(d) a meta-machine interpreter, comprising a machine instruction program located in said on-chip RAM, for executing the meta-instructions;

(e) a special machine instruction for causing the meta-machine interpreter to execute a meta-instruction at a specified location in said off-chip RAM; and (f) a meta-program counter, residing in said on-chip RAM, said meta-program counter having a value, maintained by the meta-machine interpreter, which value provides an address into said off-chip RAM.

* * * * *

UNITED STATES PATENT AND TRADEMARK OFFICE
CERTIFICATE OF CORRECTION

PATENT NO. : 5,187,793
DATED : February 16, 1993
INVENTOR(S) : John M. Keith, Allen H. Simon, David L. Sprague, Douglas F. Dixon, Judith A. Goldstein It is certified that error appears in the above-indentified patent and that said Letters Patent is hereby corrected as shown below:

Column 1, line 67, "no-chip" should read --on-chip--.

Column 6, line 44, "off-chip RAM" should read --main memory--.

Signed and Sealed this

Fifteenth Day of February, 1994

Attest:

BRUCE LEHMAN

Attesting Officer     Commissioner of Patents and Trademarks